United States Patent
Bevier

[15] 3,706,109
[45] Dec. 19, 1972

[54] VEHICLE WASHING DEVICE
[72] Inventor: Charles W. Bevier, Dallas, Tex.
[73] Assignee: Weben Industries, Inc., Dallas, Tex.
[22] Filed: April 20, 1970
[21] Appl. No.: 29,799

[52] U.S. Cl. ...............................15/21 E, 15/DIG. 2
[51] Int. Cl. ................................................B60s 3/06
[58] Field of Search..........15/DIG. 2, 21 D, 21 E, 53, 15/97

[56] References Cited

UNITED STATES PATENTS

| | | | |
|---|---|---|---|
| 3,581,335 | 6/1971 | Saxonmeyer | 15/53 |
| 3,633,231 | 1/1972 | Capra | 15/21 E |
| 3,187,359 | 6/1965 | Takeuchi | 15/21 E |
| 3,278,962 | 10/1966 | Christ | 15/21 E |
| 3,304,565 | 2/1967 | Fuhring | 15/21 E |
| 3,500,487 | 3/1970 | Capra | 15/21 D |

FOREIGN PATENTS OR APPLICATIONS 2,006,597   12/1969   France..............................15/DIG. 2

*Primary Examiner*—Edward L. Roberts
*Attorney*—George Galerstein

[57] ABSTRACT

A vehicle wash device providing one vertical, rotatable brush for cleansing of the front, rear and sides of the vehicle, and one horizontal rotatable brush for cleansing of the top of the vehicle. A movable carriage in the form of an arch extending over the vehicle is mounted on tracks adjacent to and on either side along the length of the vehicle and carries both brushes and spraying equipment. The vertical brush is employed to cleanse the sides of the vehicle as the carriage is moved along the tracks, and is employed to cleanse the front and rear of the vehicle by being moved across the overhead portion of the carriage arch while the carriage is stationary. The horizontal brush is applied to the top of the vehicle during movement of the carriage along the tracks. All functions are separately controllable by an operator who is positioned on and moves with the carriage.

1 Claim, 8 Drawing Figures

VEHICLE WASHING DEVICE

BACKGROUND OF THE INVENTION

Numerous automatic, semi-automatic and manual vehicle washing devices have been proposed, many of which are in present day use. In some of the fully automatic devices, the car or vehicle is pulled past and exposed to a series of sprays, rotating brushes and the like. As it proceeds along its length of travel, the car is used to trip switches which sequentially activate the appropriate spraying or brushing devices.

In other devices, the car is stationary while an overhead suspended carriage supporting top and side cleansing sprays and brushes circumscribe the vehicle. One variation of the latter type employs a ground based unit which is moved manually or automatically around the vehicle.

Still other ground based units involve carriages of the general type employed in the present invention, that is with an overhead rack carried by vertical members that include rolling support on the ground on either side of the vehicle, with multiple brushes automatically programmed to be applied to the vehicle as it moves along the length of the vehicle.

There are also those car washing devices with overhead longitudinal tracks positioned along the length of the vehicle and carrying the spray and brush equipment; in some of these there may be lateral overhead tracks carrying the equipment with which to cleanse the front and rear of the vehicle, or such cleansing operations may be left to manual operation.

Thus, as related, numerous types and styles of car washes have been suggested and manufactured and, considering only the ultimate result obtained, many of these provide adequate car wash facilities. However, as is typical of manufactured products, those car washes that provide the better wash require the greater outlay of capital equipment or involve considerable operating expense of one sort or another, possibly including manual cleansing to some extent. Also, those devices that are relatively fully automated are inflexible in that they must be "programmed" through a predetermined sequence and cannot readily be interrupted so as to apply the cleansing operation more fully at a portion of the vehicle that may require it more than other portions. To perform this function, manual labor is often employed, thus increasing the expense of the operation. In either instance, that of those car washes that require a considerable initial outlay of expense and equipment, or those where manual labor is involved, the economics of the situation places the device outside the reach of many businesses. For example, a car rental facility with a moderate number of automobiles at its disposal cannot afford the cost of fully automatic car washing equipment, nor is it economically desirable to employ personnel for the manual washing of the vehicles.

OBJECTS OF THE INVENTION

Thus, it is an object of the present invention to provide a vehicle washing device that can be operated at increased efficiency and economy while requiring a reduced initial capital outlay.

It is an object of the present invention to provide a vehicle washing device with automatic features that permits rendering of particular attention to those areas of the vehicle that may require it.

An additional object is to offer a vehicle washing device in which all external, vertical surfaces are capable of being cleansed by one vertical brush device.

Yet another object of the invention is to provide a fully powered vehicle wash device under the control of an operator mounted on and moving with the device itself.

An additional object of the invention is to provide a vehicle washing device that employes a minimal number of cleansing brushes.

Still another object is to provide a semi-automatic vehicle washing device that is readily adaptable to the cleansing of vehicles of varying widths.

EMBODIMENT FIGURES

DESCRIPTION OF THE CONTROLS

Figure 1:
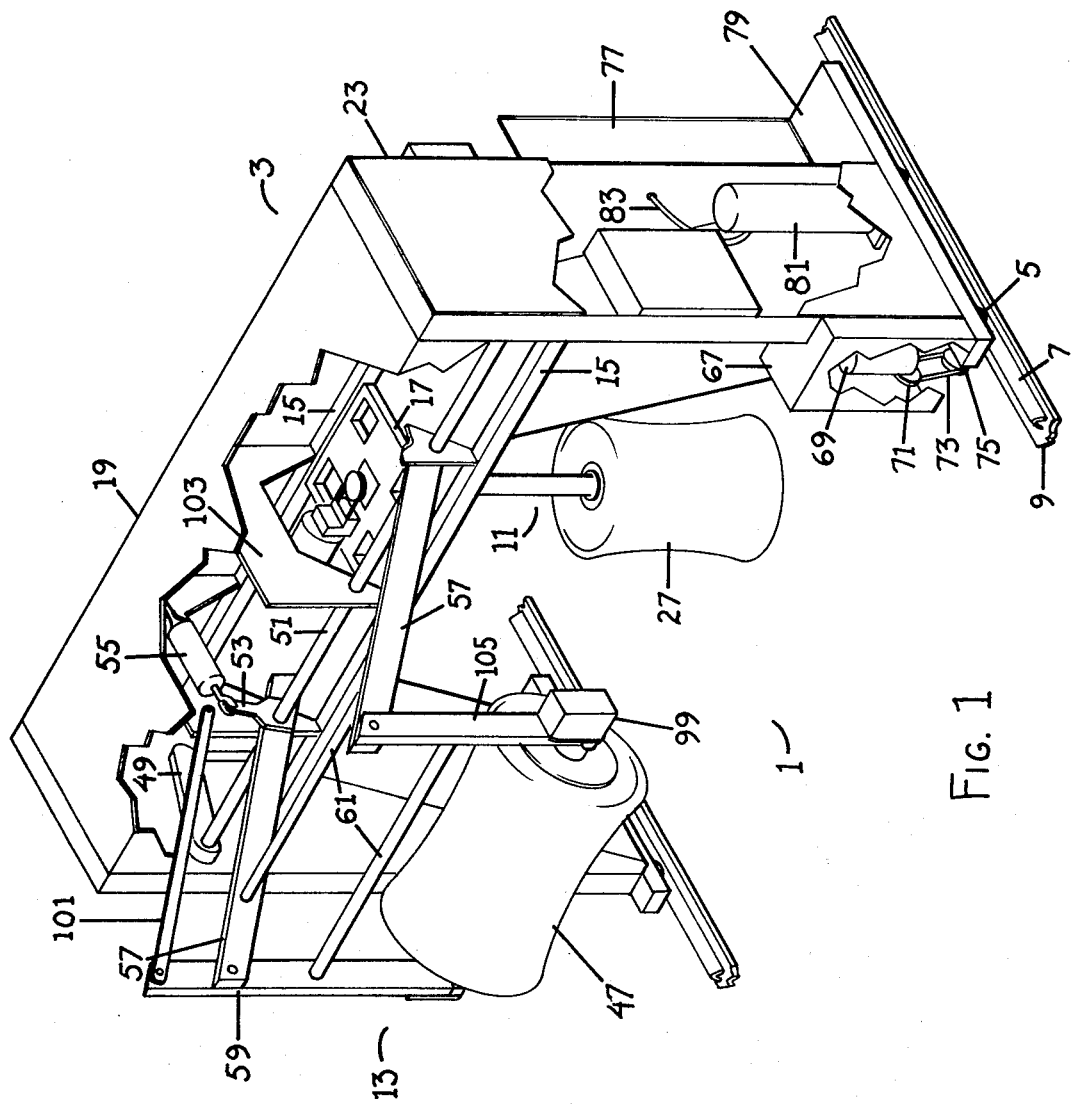
FIG. 1 is a view in perspective of the vehicle washing device of the present invention.

All functions of the device are under the control of an operator who stands on platform 79 facing control panel 63 which includes switches 93, 95 and 97; control wheel 45; and valves 85 and 87. Each of these controls is separately operatable and may be activated in combination by the operator as required.

The function of each of these controls is as follows:

a. Valve 85 has OPEN/CLOSED positions and provides for the issuance of water from a water power source (not shown) through inwardly facing outlet ports in tubing 91 which is located adjacent the two sides and over the top of the vehicle.

b. Valve 87 has OPEN/CLOSED positions and provides for the entrance of detergent into the stream of fluid flow that is impelled against and on the vehicle when lever 85 is open.

c. Switch 93 has FORWARD/OFF/REVERSE positions and controls the movement of the carriage assembly 3 along rails 7 through electric motor 69, which is reversible so that the carriage assembly can be moved along the rails in either direction.

d. Switch 95 has ON/OFF positions and controls rotation of vertical brush 27 through electric motor 37.

e. Switch 97 has ON/OFF positions and performs two functions: (1) controlling the position of horizontal brush 47, which is raised and lowered by retraction and extension of the air cylinder 55, (2) controlling rotation of horizontal brush 47 through electric motor/gear box 99.

f. Wheel 45 controls the movement and position of vertical brush 27 across the carriage assembly 3.

DESCRIPTION OF THE DEVICE

Referring to FIG. 1, the vehicle wash assembly 1 is shown in perspective and includes carriage assembly 3 comprising two vertical side support members 23, one overhead rack 19 and various intermediate rigidizing support members 103, functioning as the basic movable support structure for the carriage assembly. Channels 9 are bolted to the ground. Carriage 3 is driven on wheels 5 along rails 7 through pulley 71, drive belt 73 and pulley 75, by motor 69 which is contained in housing 67. The direction of rotation of motor 69 can be reversed and thus carriage 3 can be caused to translate in either direction along rails 7. Shaft 51 is mounted on and between the vertical members of carriage 3 and is bolted at its ends to brackets 49 which are fixedly supported by the vertical side support members 23. Shaft 51 is also intermediately supported by members 103.

Air cylinder 55 is pivotally attached at one end to member 103 and at its other end to lever 53 which is rotatably connected to shaft 51 and fixedly connected to extension 57. Extension 57 in turn is pivotally attached to arm 59 which extends downwardly to a shaft forming the axis of rotation of horizontal brush 47, and upwardly to rod 57. Rod 57 is also connected to member 103. The pivotal attaching points between members 51, 57, 59 and 101 form a parallelogram that restricts horizontal brush 47 to essentially vertical motion upon extension and retraction of air cylinder 55. Rods 61 are connected to arms 59, and between arms 59 and 105 to rigidize and stabilize the structure.

Extension of cylinder 55 will cause lever 53, arms 57 and rod 101 to rotate counterclockwise (as viewed in FIG. 1) causing brush 47 to be lowered. Retraction of cylinder 55 will cause clockwise rotation of these members and will cause brush 47 to be raised.

As previously noted, (see FIG. 3), extension and retraction of air cylinder 55 is controlled by switch 97 which also controls rotation of the horizontal brush 47 through electric motor/reduction gearbox 99 which is bolted to the arm 105. As with other driving mechanisms shown and described herein, many different arrangements may suggest themselves to persons in this and similar fields. For example, an alternative to mounting a motor/reduction gearbox on arm 105 could be to mount a motor on the housing structure and drive brush 47 by a cable and sprocket arrangement.

Figure 2:
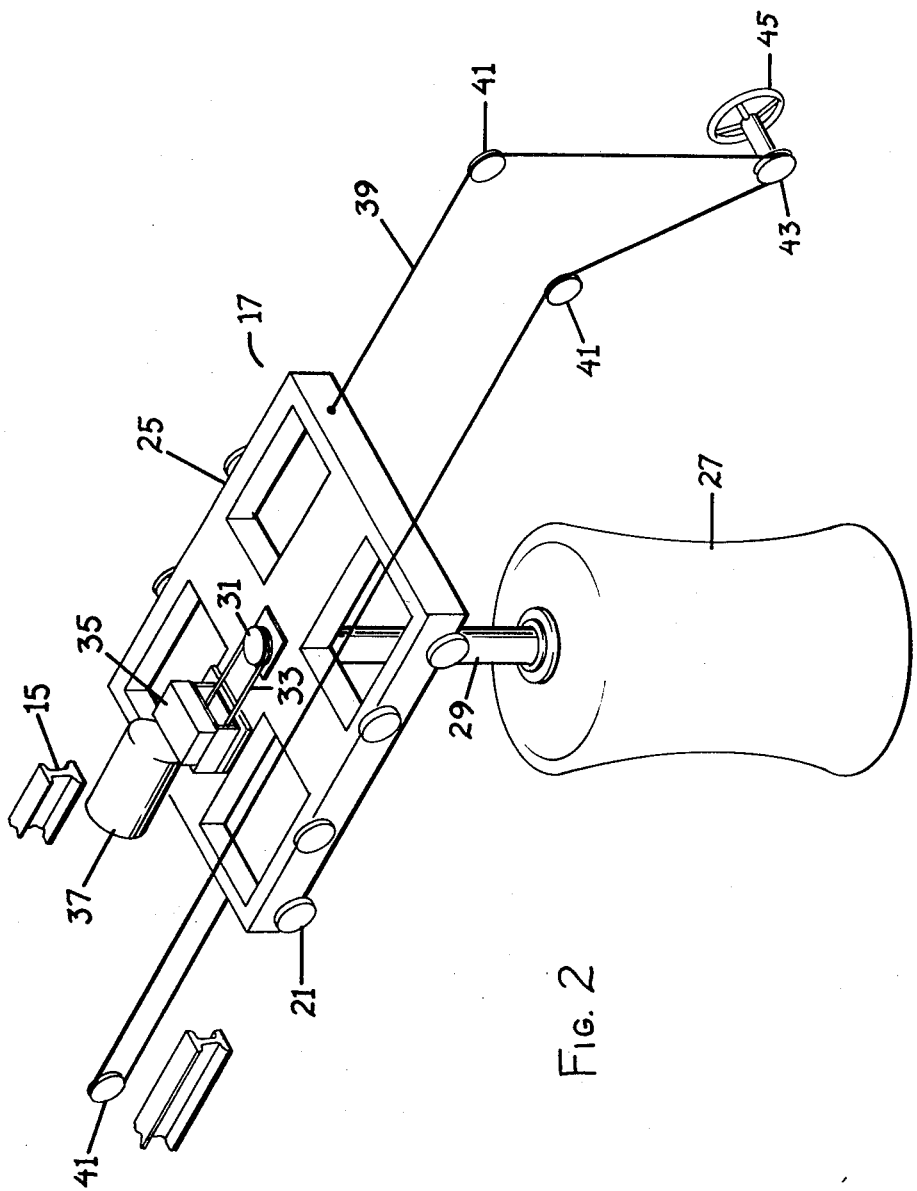
FIG. 2 is a view in perspective of the vertically disposed rotatable brush and its carriage assembly.

Referring to FIGS. 1 and 2, vertical brush 27 extends from carrier 25 of carrier assembly 17 through shaft 29 which is driven by electric motor 37. Motor 37 is mounted atop carrier 25 and drives brush 27 through gearbox 35, belt 33 and pulley 31. Carrier assembly 17 can be moved across carriage assembly 3, that is perpendicularly to the direction of movement of the carriage assembly on rails 7, by the wash operator turning wheel 45 clockwise or counterclockwise according to the direction of movement desired. As shown in FIG. 2 wheels 21, connected to carrier 25, ride in channels 15, which extend across carriage assembly 3 between its vertical members. Rotation of wheel 45 by the operator will rotate pulley 43 which will in turn cause movement of cables 39 around pulleys 41. As wire 39 is attached at opposite ends to carrier 25, such rotation of the control wheel 45 will cause carrier assembly 17 to move on wheels 21 in channels 15. As shown in FIG. 2, clockwise rotation of the wheel 45 will move carrier assembly 17 in a direction away from the viewer while counterclockwise rotation of the wheel 45 will move carrier assembly 45 in a direction toward the viewer.

Figure 3:
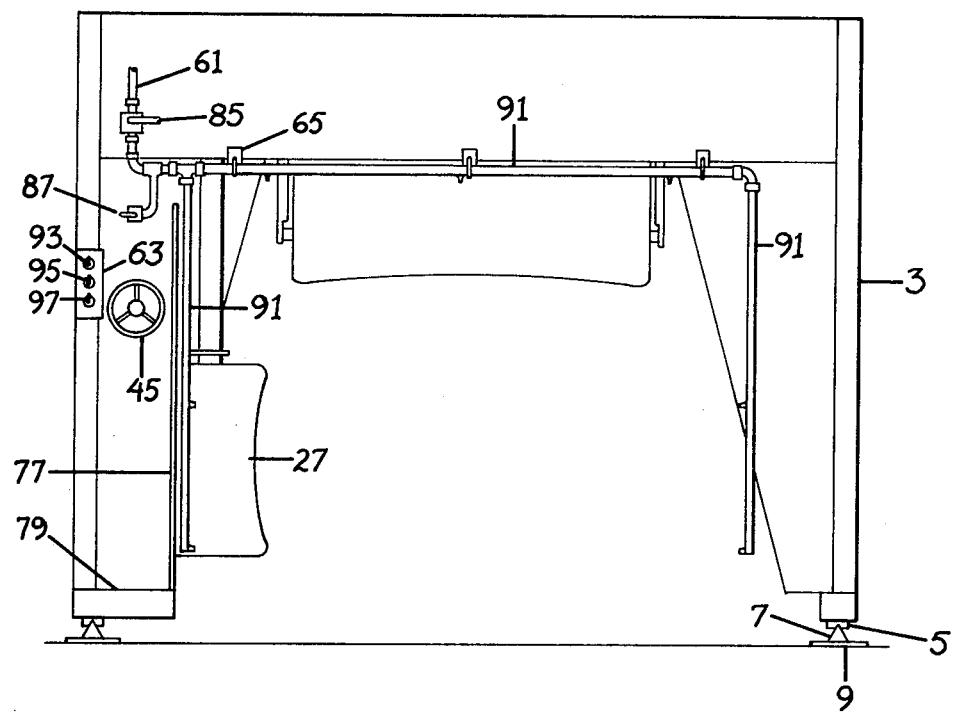
FIG. 3 is a front view of the vehicle washing device of FIG. 1 as would be seen by the driver of the vehicle upon positioning of the vehicle preparatory to its being washed.

FIG. 3 illustrates the mechanism for spraying the vehicle with water and detergent or other cleansing solution. Tubing 61 is attached to any suitable water power source and attaches to valve 85 which leads on to tubing 91 that is supported from the carriage assembly by brackets 65 adjacent two sides and across the top of the vehicle. Tubing 91 has appropriately spaced and inwardly directed apertures that permit fluid under pressure to be sprayed upon the vehicle to be washed. Tubing 61 leads into tubing 91 through valve 87 which, referring now to FIG. 1, connects to tube 83 and thence to tank 81 which contains a detergent of any suitable sort. With valve 85 open and fluid flowing through tubing 91, opening of valve 87 will cause detergent to be drawn into the flow of water by "venturi" action and will result in a combined spray of water and detergent on the vehicle.

As previously noted, the operator stands on platform 79 facing control wheel 45 and the various other control members 85, 87, 93, 95, 97 and 99. With the vehicle positioned to his right, guard 77, constructed of a transparent material such as glass or plastic, will protect him from the spray and will permit him to observe the cleansing operations.

DESCRIPTION OF OPERATION OF THE DEVICE

FIGS. 4–8 illustrate an operating procedure that may be followed in employment of the present invention.

Figure 4:
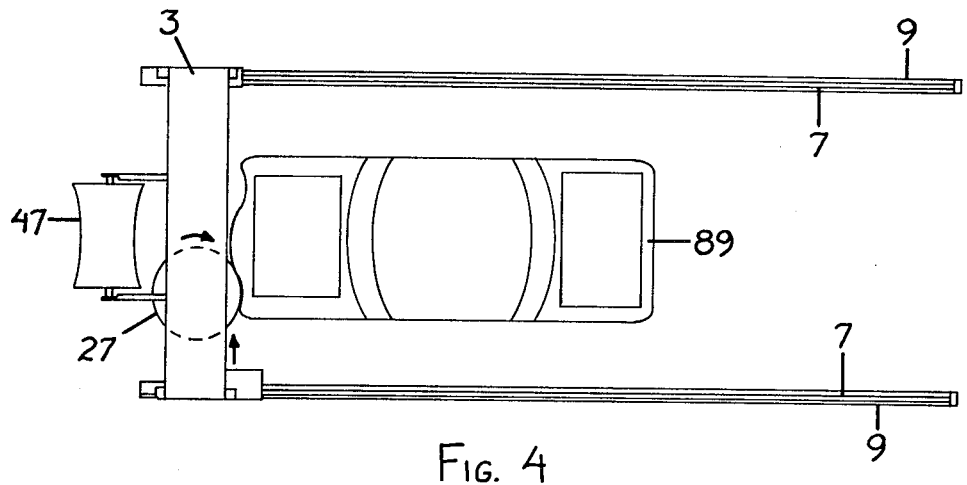
FIG. 4 is a top schematic view of the vehicle washing device in operation illustrating cleansing of the forward portion of a vehicle.

With the carriage assembly 3 positioned towards the extreme end of its travel as shown in FIG. 4, the vehicle 89 is driven to a position between the rails 7 up to a predetermined point. The car wash operator, standing on platform 79 and viewing the brush 27 and the vehicle front through the transparent, protective screen 77, will actuate switch 95 so as to cause brush 27 to rotate, and will turn control wheel 45 and switch 93 so that brush 27 is impressed against the left front fender of the vehicle with appropriate pressure for cleansing purposes. Either immediately preceding this, or directly thereafter, the operator will turn on levers 85 and 87 so that a spray of water and detergent is impelled against the front section of the vehicle through the outlet ports in tubing 91. Clockwise movement of control wheel 45 will then cause vertical brush 27 to translate across the front of the vehicle. Where particular attention to a certain section is desired, for example because of particularly encrusted dirt on that section, the operator may rotate the control wheel 45 alternatingly clockwise and counterclockwise so as to move the brush within that section. Also he may activate motor 69 through switch so as to cause movement of the carriage assembly 3, and consequently vertical brush 27, against the front of the vehicle with greater or lesser force as desired.

Figure 5:
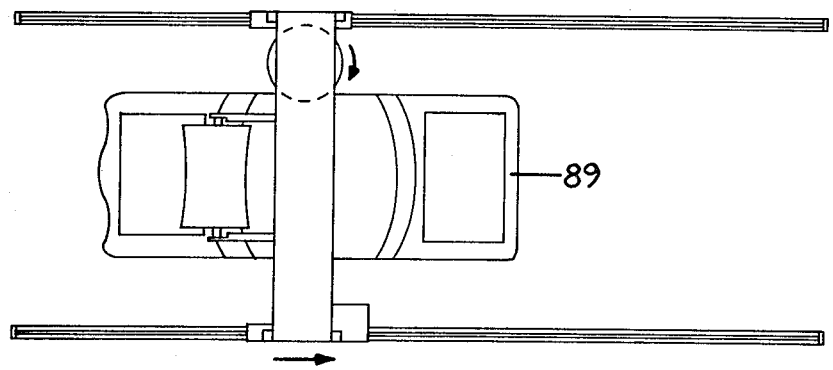
FIG. 5 is a top schematic view of the vehicle washing device in operation illustrating cleansing of the right side of the vehicle.
Figure 6:
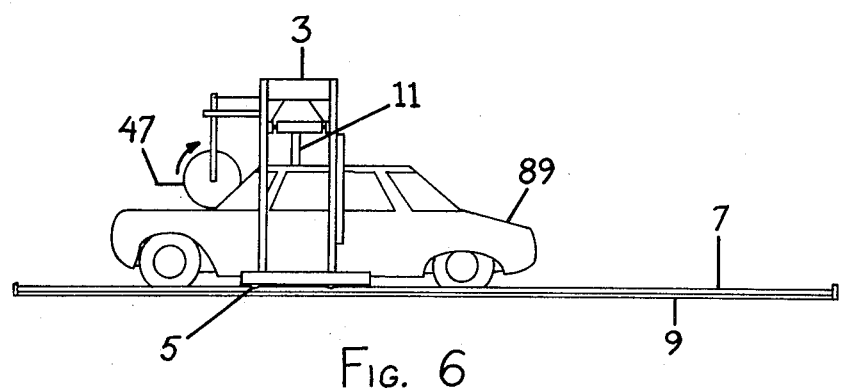
FIG. 6 is a side view of the vehicle washing device during the phase of operation shown in FIG. 5 and illustrating the cleansing of the top of the vehicle.

Once having cleaned the front of the vehicle, the operator will then proceed as illustrated in FIGS. 5 and 6 to clean the further side and top of the vehicle. The side and top are cleaned by turning wheel 45 until the vertical brush 27 is applying appropriate pressure against the side, and then turning on switches 97 and 93. Switch 97 will cut off the air pressure to cylinder 55 and permit the horizontal brush to descend to the height where it will contact the car hood. Counterweighting and spring restraint of the brush, which can be done in any number of well known conventional ways, will provide a proper net force on the car top. With the vertical brush 27 against the side of the vehicle, and the horizontal brush 47 against the vehicle hood, or at least ready to contact the hood with movement of the carriage assembly 3 on rails 7, the operator will actuate switch 93 causing motor 69 to move the carriage assembly along rails 7 until both vertical brush 27 and horizontal brush 47 have passed over the entire length of vehicle.

Figure 7:
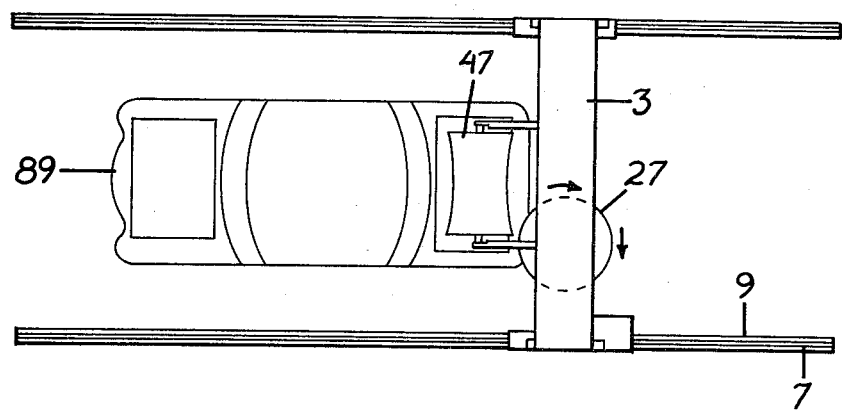
FIG. 7 is a top schematic view of the vehicle washing device in operation cleansing the rear portion of the vehicle.

At this point the operator will actuate switch 97 to introduce air pressure to one side of cylinder 55 so as to retract the cylinder, raise horizontal brush 46 to a position over the top of the vehicle, and discontinue rotation of the brush. With the horizontal brush 47 in its "up" position he will then apply vertical brush 27 to the rear of the car as illustrated in FIG. 7 in the same manner as previously applied to the front of the vehicle, ending up with the vertical brush adjacent the near side of the vehicle.

Figure 8:
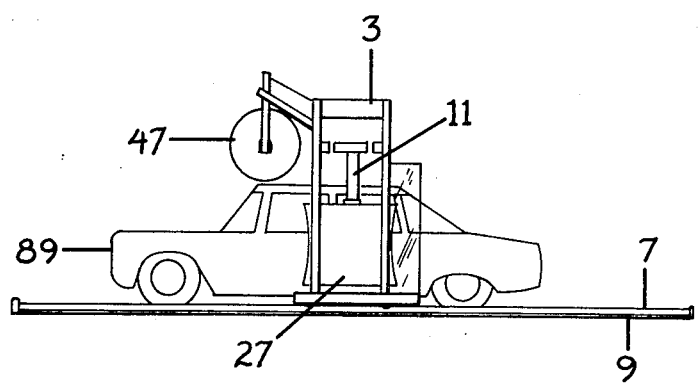
FIG. 8 is a top schematic view of the vehicle washing device in operation cleansing the left side of the vehicle.

With the front, rear and further side cleansed, the operator will now manipulate control wheel 45 so that there is appropriate pressure applied by the brush to the rear fender of the near side of the vehicle. He will turn off lever 87 to block entrance of detergent material into the fluid flow through tube 91, and will actuate switch 93, this time placing it in "FORWARD" position so as to cause the carriage assembly to move forwardly along the length of the vehicle as shown in FIG. 8.

Inasmuch as only water and no detergent is now being impelled upon the vehicle, this final pass of the carriage assembly will perform a rinsing operation. The vertical brush 27, being positioned forward or ahead of the spray tubing 91 (the nose of the illustrated vehicle being considered as "forward") the vertical brush will be cleansing the near side prior to its being rinsed as the carriage assembly moves forwardly along the length of the vehicle.

More succinctly, the operating procedure can be set forth in 11 steps as follows:

1. Open water and detergent valves 85 and 87.
2. Turn switch 95 "ON" to rotate vertical brush 27.
3. Turn switch 93 to REVERSE position. Let the carriage 3 travel rearwardly until vertical brush 27 presses against the front of the vehicle. Turn switch 93 "OFF."
4. Turn wheel 45 to the right to scrub across front of vehicle.
5. After vertical brush 27 has scrubbed across the front of the vehicle to the right side, turn switch 97 "ON" and place switch 93 in "REVERSE."
6. Using wheel 45, hold vertical brush 27 snugly against the right side of the vehicle as the carriage 3 travels to the rear. Lift horizontal brush 47 briefly by turning switch 97 "OFF" to avoid radio antennae and the like that will not clear the horizontal brush.
7. As horizontal brush 47 falls off the rear of the vehicle, turn "OFF" switches 93 and 97. This will stop the carriage 3 and stop and raise the horizontal brush. Also, close the detergent valve 87.
8. Turn switch 93 to "FORWARD"; let the carriage move up until the vertical brush 27 engages the back of the vehicle; turn switch 93 "OFF."
9. Turn wheel 45 to the left to scrub across the back of the vehicle.
10. After scrubbing back of vehicle, turn switch 93 to "FORWARD" and hold vertical brush 27 against the left side of the vehicle with wheel 45 as the detergent valve 97 has been closed (step 7) rinsing takes place during this part of the cycle.
11. Let the carriage 3 travel forward near the end of rails 7, ready for the next vehicle. Turn off switches 93 and 95 and water valve 85.

Clearly, modifications of this operational procedure may be employed using the present invention, the above representing only one of many possible variations.

It has been found advantageous to move the vertical brush 27 around the vehicle in the same rotational direction as that of the vertical brush around its own axis; that is, if, as illustrated in the FIGS. 4–8, the vertical brush is rotating clockwise (looking down) then it is preferable to move the vertical brush counterclockwise around the vehicle so that it will tend to pull itself along somewhat.

As a safety measure, a switch may be used in connection with the position of the horizontal brush to prevent the carriage from moving forward on the rails if the horizontal brush is in the down position, thus preventing hooking of the horizontal brush on the back of the vehicle.

Having described the invention in connection with a certain specific embodiment thereof, it is to be understood that further modifications may now suggest themselves to those skilled in the art, and it is intended to cover such modifications as fall within the scope of the appended claims.

What is claimed is:

1. A washing device for a vehicle having two sides, a front, a rear, a top, a longitudinal axis and a lateral axis, said washing device comprising:
   a. guide means parallel to said longitudinal axis,
   b. an arch movably attached to said guide means and extending adjacent two sides and the top of the vehicle parallel to the lateral axis of the vehicle,
   c. a vertical rotatable brush slidably connected to said arch and positionable across said arch at least to the extent of the length of the lateral axis of the vehicle,
   d. a horizontal, rotatable brush mounted on said arch and positionable with respect thereto so as to at least contact the top of said vehicle,
   e. spray means mounted on said arch adjacent the two sides and the top of the vehicle,
   f. first means for rotating said vertical and horizontal brushes,
   g. manually powered second means for positioning said vertical brush across said arch,
   h. third means for moving said horizontal brush vertically with respect to said arch,
   i. fourth means for moving said arch on said guide means, j. selectively operable control means for said spray means and for said first, second, third and fourth means, and
k. an operator platform adjacent said selectively operable control means whereby an operator positioned on the operator platform has access to the selectively operable control means to provide for cleansing of the two sides, the front and the rear of the vehicle by the vertical brush, and for the cleansing of the top of the vehicle by the horizontal brush.

* * * * *